Nov. 2, 1965  R. J. PURVIS  3,215,590
MICA SHEET COMPOSITE AND METHOD OF MAKING SAME
Filed Nov. 27, 1961
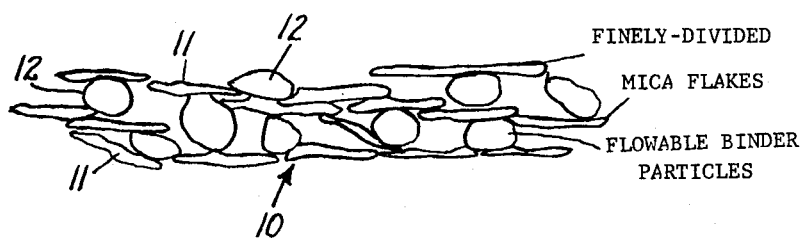
INVENTOR.
ROBERT J. PURVIS
BY
Carpenter, Abbott, Coulter & Kinney United States Patent Office 3,215,590
Patented Nov. 2, 1965

3,215,590
MICA SHEET COMPOSITE AND METHOD
OF MAKING SAME
Robert J. Purvis, St. Paul, Minn., assignor to Minnesota
Mining and Manufacturing Company, St. Paul, Minn.,
a corporation of Delaware
Filed Nov. 27, 1961, Ser. No. 155,110
8 Claims. (Cl. 162—152)

This application is a continuation-in-part of my copending application Ser. No. 795,552, filed February 25, 1959, now abandoned.

The present invention relates to micaceous insulating structures; more particularly it relates to novel finely-divided highly-flaked mica sheet composites having binder constituents uniformly incorporated therein, and to novel procedures for manufacturing the same.

Finely-divided exfoliated and/or delaminated flaked mica which is capable of being formed into paper-like sheets on conventional paper-forming equipment has been known commercially for over fifteen years. Various procedures have been suggested during this period for reconstituting natural mica into such form. In this regard see Heyman United States Patent No. 2,405,576, granted August 13, 1946; Bardet United States Patent No. 2,549,880, granted April 24, 1951; De Senarclens United States Patent No. 2,614,055, granted October 14, 1952; and Bouchet United States Patent No. 2,719,158, granted May 24, 1955.

Such paper-like mica sheets, after impregnation with resinous or other adjuvant materials, and after being heat-pressed to cure the impregnated composite, have excellent dielectric properties and have found substantial use as insulation materials. For example, they are widely employed as insulating commutator segments for electric motors, commutator V-rings and insulating spacers and washers. Such insulating materials usually have thicknesses ranging from about 10 to 60 mils (.25 to 1.5 mm.) after they have been finally pressed and molded.

A major disadvantage in heretofore known impregnated paper-like mica sheets is the difficulty, as a practical commercial matter, of forming them in sufficient thicknesses so that it is unnecessary to lay them up in laminar form in order to attain the final desired thickness after pressing. The finely-divided mica particles in the paper have great affinity toward one another. The paper-like sheets are difficult to dry in any substantial thicknesses, and more difficult subsequently to impregnate, even where thinly fluid impregnating solutions are used. When laid up and pressed in laminar form, in order to obtain desired thicknesses, the composite products tend to delaminate during sawing and punching operations, particularly where the insulative segments are of intricate shapes (as they often are).

A primary object of the present invention is to provide novel procedures by which mica sheet composites can be formed in substantially any desired thickness without necessity of laying up the sheets to form a laminated structure. Another object of the present invention is to provide novel non-laminar structures having thicknesses as great as 60 mils (1.5 mm.) or more after final pressing directly by paper making processes or in a conventional sheet mold, obviating subsequent lay up procedures to attain desired thicknesses. A further object of the invention is to provide mica sheet composites which are readily punched or molded even in extremely intricate shapes without delamination or edge chipping.

The manner in which these and other important advantages and objectives are attained in accordance with the present invention will now be illustrated with the aid of the following non-limiting illustrative examples.

EXAMPLE 1

A mica pulp was first prepared in accordance with the teachings of the aforesaid De Senarclens United States Patent No. 2,614,055. Briefly, scrap mica splittings, or their equivalents, were heat-treated at approximately 800° C. for 10 to 15 minutes, immersed in water and then separated into very thin finely divided flakes by agitation of the water slurry with a high speed mixer. Agitation was continued until the flakes passed a 10 mesh screen.

One thousand parts of the thus prepared pulp (on a dry basis) were placed in a suitable container. The slurry was then diluted by the addition of about 10,000 parts water.

Separately, a bond composition was prepared. A high grade orange shellac button lac (available commercially under the trade designation "No. 1 Pure Button Lac") was ground in a conventional ball mill until it had a nominal particle distribution, by weight, as follows: 15% 40–100 mesh, 70% 100–200 mesh, 15% 200–400 mesh. To 90 parts of the thus ground shellac was added one part of a non-ionic wetting agent, such as the low foaming 100% solids alkyl aryl ether wetting agent obtainable commercially from Rohm and Haas Co. under the trade designation "Triton CF-10." Sufficient water was then added and the mass was mixed until it exhibited a smooth consistency and the shellac was thoroughly wet. Additional water was mixed into the composition to dilute the same to attain the desired consistency, that is, about 25 to 50% solids, after which it was passed through a 35 mesh screen and added slowly to the mica-containing slurry with vigorous agitation. Further water (making the total water content 21,800 parts) was then added, the slurry thus having a consistency of 5% solids. It should be noted, however, that sheets have been made using a slurry with a consistency of from 2 to 10% solids. The slurry was then agitated for about 10 minutes with a high speed mixer.

9.8 lbs. (4.4 kg.) of the previously prepared slurry was poured into an 18 inch by 18 inch (45.7 cm. x 45.7 cm.) sheet mold having a 60 mesh forming screen and a vacuum drainage system. The sheet mold was rocked slightly in order to distribute the slurry evenly over the forming screen. A vacuum of 20 inches of mercury was then applied for approximately 2 minutes during which time about 50% of the water was drawn through the screen and removed. After the vacuum pump was turned off, the upper section of the sheet mold was removed. The edges of the formed composite mica sheet were loosened around the screen with a spatula, and the sheet was transferred to a steam drying table with the aid of a screen transfer frame. The sheet was then dried on the drying table at a temperature of 210° F. (98.89° C.) for approximately 15 minutes, that is, until the moisture content was reduced at least below 25% by weight.

At this point the dried sheet was stiff and firm and readily capable of supporting its own weight and of being shipped in commerce. Nominal thickness of the sheet was about 60 mils (1.5 mm.). The resultant structure of the sheet may be represented in the accompanying greatly enlarged schematic drawing. The sheet 10 is rather porous due to the presence of the solid resin particles 12, the latter for the most part remaining in discreet particulate form although some of them undoubtedly heat-flow somewhat during the drying operation. The size of particles 12 of the resin are much larger than the thickness of the mica flakes 11. Said flakes are thus spread relatively far apart as compared with their association in a paperlike sheet containing no resinous particles.

During drainage of the sheet in the sheet mold it was noted that over 95% of the resin particles was retained in the sheet despite the fact that virtually all of the resin particles were small enough to pass through the forming screen of the sheet mold. The time during which the water was drained from the sheet on the sheet mold was extremely rapid as compared with the time necessary to remove an equivalent amount of water from a corresponding paper-like sheet of finely-divided mica but containing no resin particles. These features of the invention are important to its commercial practicality. Particularly is this true where the sheets are formed on continuous commercial equipment such as a Fourdrinier machine.

The porous intermediate sheet as thus formed can be immediately molded or pressed to shape. For example, from the sheet structure of the instant example were ultimately punched commutator insulator segments. The sheet thus was pressed between platens steam-heated to a temperature of 165° C. The pressing cycle was as follows: A minimum contact pressure was applied for about 10 minutes to allow removal of residual moisture. The press was then opened to allow steam to escape from the surfaces of the sheet. Full 800 p.s.i. (56 kg./cm.) pressure was then applied for about one minute, following which the press was again opened to allow the final traces of moisture to escape. Full pressure was again applied for 4 hours, the platens being maintained at 165° C. throughout. During pressing the resin particles were liquified, and the resin flowed in and about the mica flakes and then became cured to form a virtually void-free strong firmly unified non-laminar product. At the end of the 4 hour period cold water was passed through the platens to cool them and the pressed cured sheet, following which the press was opened and the plate removed.

The resulting cured plate, having a nominal thickness of 30 mils (.76 mm.) was then milled to remove any high spots, following which commutator insulator segments were punched therefrom. The sheet was observed to punch cleanly and accurately, even with moderately dull punching dies. No delamination occurred.

Test results for the plate of this example were as follows:

Flexural strength:
    ASTM D–790 _____ 38,000 to 40,000 p.s.i.
        2,660 to 2,800 kg./cm.$^2$).
Compression:
    Percent deformation at 14,000
      p.s.i. (980 kg./cm.$^2$), 150°
      C., 5 min. _____ .5%.
Dielectric strength:
    ASTM D149–44 2 inch elec.
      trodes short time _____ 800 volts/mil (31,496
        volts/mm.).
Resin content (start) _____ 8.25%.
Resin content (final) _____ 8.10 to 8.2%.

EXAMPLE 2

500 parts of a mica pulp was first prepared in accordance with the teachings of the aforenoted Bardet United States Patent No. 2,549,880; an equal amount of thin mica splittings having a nominal particle size of ⅜ in. x ⅜ in. x .00025 in. (9.4 mm. x 9.4 mm. x .00635 mm.) thickness was also procured. A solid resin dispersed modified mica slurry, utilizing a bond composition prepared exactly in the manner of Example 1, was produced by the same methods and in the same proportions as in Example 1.

The stock was then fed onto a conventional Fourdrinier machine wire (42 x 60 mesh) operating at a speed of 5 ft./min. (1.5 meter/mm.) at a rate sufficient to give a basis weight of 180 gm./ft.$^2$ (180 gm./929 cm.$^2$). Surface water on the web was completely drained approximately eight feet (2.5 meters) from the head-box. The sheet (70% moisture, 30% stock) was transferred from the Fourdrinier wire to an oven wire conveyor by a vacuum transfer roll. The oven was operated at a temperature of 450° F. (230° C.) with forced air circulation. At the end of the oven, the sheet containing less than 25% moisture could be easily handled and although the resin has flowed sufficiently to improve the handling strength, it was not "advanced" to any degree. The continuous web was sheeted into 38 x 42 in. (86.5 x 106.68 cm.) boards and stacked on a pallet. The boards were then pressed into dense plates by the following method:

(1) A multiple opening press was heated to 165° C.
(2) A press load consisting of a steel cover, thin zinc plate, polytetrafluorethylene coated fibre glass release sheet, mica-resin board, release sheet, thin zinc plate, asten felt cushion, thin zinc plate, release sheet, mica-resin board, release sheet, thin zinc plate, and steel cover was prepared for each opening.
(3) Each load was placed in an opening and the press was closed to contact pressure for 10 minutes (no head pressure) to further dry the board.
(4) The press was opened to remove final traces of entrapped moisture and then closed again and about 60–70 p.s.i. (4.2–4.9 kg./cm.$^2$) applied for five minutes.
(5) Full pressure was then applied (800 p.s.i. (56 kg./cm.$^2$)) and maintained for two hours.
(6) The press was then cooled maintaining full pressure on the plates. After cooling the pressure was released and the plates removed.
(7) The plates were then milled on a drum sander to .030±.0005 inch (.76±.0127 mm.).
(8) The finished plates were then cut into strips 3 x 42 inches (7.6 x 106.68 cm.) and commutator segments were punched from these strips using standard segment plate punch and dies. No delamination occurred.

Test results for the plates of this example were as follows:

Flexural strength:
    ASTM D–790 _____ 38,000 to 46,000 p.s.i.
        (2,660 to 3,220 kg./cm.$^2$).
Compression:
    Percent deformation
      at 14,000 p.s.i. (980
      kg./cm.$^2$), 150° C.,
      5 min. _____ .3%.
Dielectric strength:
    ASTM D149–44 2
      inch electrodes—
      short time _____ 835 volts/mil
        (32,875 volts/mm.).
Resin content (start) ____ 8.25%.
Resin content (final) ____ 8.0 to 8.15%.

EXAMPLE 3

The procedure of Example 1, but substituting the thin mica splittings and the mica pulp for the mica pulp of the example, was used to form a slurry in the following proportion:

600 parts thin mica splittings
150 parts mica pulp
250 parts "No. 1 Pure Button Lac," prepared as in Example 1
1 part "Triton CF–10"
21,800 parts water Composite mica plates were formed by the sheet molding method of Example 1 and the paper making method of Example 2, cut to size (38 x 42 in. (86.5 x 106.68 cm.)), dried to 1% moisture at 150° F. (65° C.) and pressed at 165° C. at 200 p.s.i. (14 kg./cm.$^2$), until a bead was formed. No differences in properties were noted in the plates produced by either of the above-noted methods.

Addition of the thin mica splittings improved the drying rate of the unpressed plate and the moldability (draw) of the pressed plate while the mica pulp provided the necessary density by "packing" the interstices of the splitting while also performing its resin retaining function.

Shapes molded from this material had good confirmation with no delamination, has a final resin content of 23 to 24% (indicating good retention—starting resin content of 25%) and an electric breakdown strength (ASTM D149–44 2 inch electrodes—short time) of 750 to 800 volts/mil (29,530 to 31,496 volts/mm.).

EXAMPLE 4

One hundred parts of a solid epoxy resin condensation product of epichlorhydrin and bisphenol A having a Durrans' softening point of about 70° C. and an epoxide equivalent of about 490 (obtainable commercially from Shell Chemical Corporation under the trade designation "Epon 1001") was melted and heated to a temperature of 95 to 110° C. To this molten resin 15 parts of diaminodiphenyl sulfone and 1 part of boron trifluoride monoethylamine complex, obtainable commercially from General Chemical Div. of Allied Chemical Corporation under the trade designation "BF 3400," was added. The mixture was kept as approximately 100° C. with vigorous stirring until the dissolution was complete. The resin was then cooled rapidly to the solid state, dried and ground so that the particles passed through a 35 mesh screen.

Using the procedure outlined in Example 1, a solid resin-mica pulp dispersion was made in the following proportion:

900 parts mica pulp
100 parts "Epon 1001" resin as prepared above
1 part "Aerosol OT," a wetting agent obtainable commercially from American Cyanamid Co.
21,800 parts water From this dispersion composite mica boards were formed by the sheet molding method of Example 1 and the paper making methods as set forth in Example 2. The boards were cut to the desired size (38 x 42 in. (86.5 x 106.68 cm.)), dried at 150° F. (65° C.) to 1% moisture and pressed for 1½ to 2 hours at 165° C. and 800 p.s.i. (56 kg./cm.$^2$).

Test results were as follows:

Flexural strength:
    ASTM D-790 _____ 50,000 to 60,000 p.s.i.
                                   (3,500 to 4,200 kg./cm.$^2$).
Compression:
    Percent deformation at 14,000 p.s.i. (980 kg./cm.$^2$) 250° C., 5 min. _____ 1%.
Dielectric strength:
    ASTM D149–44 2 inch electrode—
        short time _____ 900 to 1100 volts/mil.
                               (35,433 to 43,308 volts/mm.).
Resin content (start) ____ 10%.
Resin content (final) _____ 9.5 to 10%.

EXAMPLE 5

Using the procedure outlined in Example 1 but substituting silicone resin for the shellac of the example, a solid resin-mica pulp dispersion was made in the following proportion:

850 parts mica pulp
150 parts solid silicone resin (obtainable commercially from Dow Corning Corp. under the trade designation "R–5061"), ground to pass through a 100 mesh screen
1 part "Triton CF–10"
21,800 parts water Using this dispersion and the sheet molding method outlined in Example 1 and the paper making methods of Example 2, composite mica boards were formed. The boards were cut to size (38 x 42 in. (86.5 x 106.68 cm.)), dried to 1% moisture and pressed at 250° C. and 1000 p.s.i. (70 kg./cm.$^2$) for 3 hours.

Test results were as follows:

Flexural strength:
    ASTM D–790 _____ 25,000 to 30,000 p.s.i.
                                  (1,750 to 2,100 kg./cm.$^2$).
Compression:
    Percent deformation at 14,000 p.s.i. (980 kg./cm.$^2$) 300° C., 5 min. _____ 1%.
Dielectric strength:
    ASTM D149–44 2 inch electrodes—
        short time _____ 1200 volts/mil (47,244 volts/mm.).
Resin content (start) ____ 15%.
Resin content (final) ____ 14 to 14.5%.

EXAMPLE 6

Using the previously outlined procedure of Example 1, a solid resin-mica pulp dispersion is prepared from the following materials:

750 parts mica pulp
250 parts "No. 1 Pure Button Lac" (−100 mesh)
2 parts "Triton CF–100"
50,000 parts water A 4 mil (0.1 mm.) composite mica paper is formed using conventional paper making methods (wire size— 42 x 60 mesh; machine speed—30 ft./min. (9 meters/min.) from the prepared dispersion. The 4 mil (0.1 mm.) sheet is then hot calendered between heated pressure rolls sufficient to flow the resin around and about the mica flakes. The resulting sheet is translucent, and is useful as an insulative sheet when molded to the shape desired under heat and pressure to cure the bond.

EXAMPLE 7

Following the procedure of Example 6, a solid resin-mica pulp dispersion was prepared from the following materials:

900 parts mica pulp
100 parts polyester resin (obtainable commercially from Goodyear Tire and Rubber Co. under the trade designation "CX 1036") ground to pass through a 35 mesh screen.
1 part "Triton CF–10"
50,000 parts water A 4 mil (0.1 mm.) composite mica paper was formed using conventional paper making techniques from the prepared dispersion. The 4 mil (0.1 mm.) paper was then hot calendered between heated pressure rolls sufficient to flow the resin and improve bonding. The resulting calendered sheet was clear and transparent with excellent tensile strength of 30,000 to 40,000 p.s.i. (2,100 to 2,800 kg./cm.$^2$).

EXAMPLE 8

Sixty parts of a solid epoxy resin condensation product of epichlorhydrin and bisphenol A having a Durrans' softening point of about 80° C. and an epoxide equivalent of 550–700 (obtainable commercially from Shell Chemical Corporation under the trade designation "Epon 1002") and thirty parts of phthalic anhydride, both ground so that the particles passed through a 100 mesh screen, were dispersed in a solution of two parts of "Aerosol OT" and three hundred and fifty-five parts water. When complete dispersion was obtained, 0.25 part of a foam reducing agent (obtainable commercially from Dow Corning Corporation under the trade designation "Antifoam B Emulsion") was added to reduce foaming.

This resin dispersion was added to a mica pulp slurry containing 1000 parts mica pulp and 21,800 parts water according to the slurry making procedure outlined in Example 1.

Using the paper making methods as set forth in Example 2, composite mica boards were formed. The board was then cut to the desired size (38 x 42 in. (86.5 x 106.68 cm.)), dried and pressed for three hours at 165° C.

Test results were as follows:

Flexural strength:
   ASTM D-790 _____ 45,000 to 48,000 p.s.i. (3,150 to 3,360 kg./cm.$^2$).
Compression:
   Percent deformation at 14,000 p.s.i. (980 kg./cm.$^2$) 150° C., 5 min. _____ 1%.
Dielectric strength:
   ASTM D149-44 2 inch electrodes — short time _____ 1000 to 1200 volts/mil (39,370 to 47,244 volts/mm.).
Resin content (start) _____ 8.25%.
Resin content (final) _____ 8 to 8.25%.

As has been indicated, the resin content of the composite mica plates can be adjusted depending on the ultimate use of the composites. Much higher resin content, for example, in the order of 12 to 30% by weight, is ordinarily employed where the composite is to be molded and drawn such as in the formation of commutator V-rings. It is contemplated, however, that the final resin content is to be maintained at about 6 to 30%.

It is, of course, known that it is extremely difficult to remove water from reconstituted mica sheets. Resin particles added to a pulp before formation promote and facilitate drainage of the sheet and provide the bond for the final product. It has been found that while the particle size of the resinous bonding material of the present invention can vary widely, an effective particle size coarser than about 15 microns is necessary to promote proper drainage, particles coarser than 37 microns being preferred. It is to be understood that while particles coarser than about 15 microns and preferably coarser than 37 microns are utilized in the present invention, very fine particles (sub-sieve sizes) may be utilized by using smaller amounts of wetting agent insufficient to prevent agglomeration of the resin particles; in this manner the effective particle size of the resin dispersion is increased, making possible the use of very fine particles. The particle size should, however, remain substantially greater than colloidal size.

The following tables serve to show the effect of resin particle size and resin content on drainage characteristics of mica pulps prepared in accordance with the teachings of the aforementioned Heyman United States Patent No. 2,405,576; Bardet United States Patent No. 2,549,880; De Senarclens United States Patent No. 2,614,055 and Bouchet United States Patent No. 2,719,158.

In all of the samples, 40 grams of dry mica pulp and 700 cc. of water were mixed together with gentle stirring until the mixture was uniform. If a resin addition was to be made, the resin was then dispersed in 100 cc. of water containing 0.5 cc. of "Triton CF-10" and added to the mica slurry. If no resin addition was to be made, 100 cc. of water was added to the slurry. The total volume of water in all cases was therefore 800 cc. After gentle stirring of the slurry to insure a uniform mixture, the material was poured into a sheet mold with a 60 mesh drainage screen and vacuum drained at a constant vacuum of 10 inches of mercury. The tables show the time necessary to drain the sheet to a 72% moisture content (72% H$_2$O, 28% stock) and to drain 700 cc. of water from the sheet at five levels of resin addition. The 72% moisture level is significant since this is the approximate maximum moisture a sheet can carry and still be mechanically transferred.

*Table 1.—The effect of 5 levels of resin addition (—100 +200 mesh) on the drainage time of mica pulps*

| Resin Addition | Heyman Pulp | | De Senarclens Pulp | | Bardet Pulp | | Bouchet Pulp | |
|---|---|---|---|---|---|---|---|---|
| | 72% (sec.) | 700 cc. (sec.) | 72% (sec.) | 700 cc. (sec.) | 72% (sec.) | 700 cc. (sec.) | 72% (sec.) | 700 cc. (sec.) |
| 0% | 110 | 110 | 120 | 120 | 133 | 133 | 124 | 124 |
| 6% (2.54 gm.) | 24.5 | 25 | 55 | 57 | 86 | 89 | 61 | 66 |
| 10% (4.45 gm.) | 18 | 19 | 49 | 54 | 78 | 86 | 51 | 58 |
| 20% (10.0 gm.) | 13 | 15 | 41 | 53 | 61 | 68 | 47 | 55 |
| 30% (17.1 gm.) | | | 32 | 50 | 50 | 65 | 39 | 52 |

*Table 2.—The effect of controlled resin particle size on drainage time to 72% moisture at five levels of resin additions*

| Resin Addition | Resin Particle Size Range | | | | | | |
|---|---|---|---|---|---|---|---|
| | 0 (sec.) | 24–60 Mesh (sec.) | 60–100 Mesh (sec.) | 100–200 Mesh (sec.) | 200–400 Mesh (sec.) | 72 Hr. Ball Milled (sec.) | 200 Hr. Ball Milled (sec.) |
| 0% | 120 | | | | | | |
| 6% (2.54 gm.) | | 80 | 62 | 55 | 52 | 91 | 94 |
| 10% (4.45 gm.) | | 64 | 52 | 49 | 46 | 80 | 103 |
| 20% (10.0 gm.) | | 46 | 41 | 45 | 45 | 78 | 189 |
| 30% (17.1 gm.) | | 30 | 31 | 32 | 40 | 84 | 200 |

*Table 3.—The effect of controlled resin particle size on the time to drain 700 cc. of water at five levels of resin addition*

| Resin Addition | Resin Particle Size Range | | | | | | |
|---|---|---|---|---|---|---|---|
| | 0 (sec.) | 24–60 Mesh (sec.) | 60–100 Mesh (sec.) | 100–200 Mesh (sec.) | 200–400 Mesh (sec.) | 72 Hr. Ball Milled (sec.) | 200 Hr. Ball Milled (sec.) |
| 0% | 120 | | | | | | |
| 6% (2.54 gm.) | | 85 | 65 | 57 | 56 | 99 | 100 |
| 10% (4.45 gm.) | | 70 | 58 | 54 | 55 | 91 | 113 |
| 20% (10.0 gm.) | | 58 | 55 | 53 | 55 | 90 | 213 |
| 30% (17.1 gm.) | | 49 | 53 | 50 | 51 | 116 | 238 |

*Table 4.—The effect of resin addition (−100+200 mesh particles) on drainage time with increasing base weights*

| Base wt. of Sheet Formed (gm. of Mica/ft.$^2$) (gm. of Mica/929 cm.$^2$) | Wt. Mica (gm.) | Wt. Resin | Time 72% (sec.) | Approx. Pressed Thickness |
|---|---|---|---|---|
| 30 gm./ft. (gm./929 cm.$^2$) | 13.4 | 0 | 30 | .005″ (.127 mm.). |
| 30 | 13.4 | 1.52 gm. (10%) | 20 | |
| 90 gm./ft. (gm./929 cm.$^2$) | 40.0 | 0 | 120 | |
| 90 | 40.0 | 4.45 gm. (10%) | 49 | .015″ (.381 mm.). |
| 180 gm./ft. (gm./929 cm.$^2$) | 80.0 | 0 | 294 | |
| 180 | 80.0 | 8.9 gm. (10%) | 95 | .030″ (.762 mm.). |

*Table 5.—Resin retention of mica pulps (ASTM D–352) resin particle size vs. resin retention*

| Type of Mica Pulp | Resin Addition (Based on Wt. of Total Solids) (percent) | Final Resin Content (Based on Total Solids), Particle Size Range of the Resin Addition | | | | | |
|---|---|---|---|---|---|---|---|
| | | 24–60 Mesh (percent) | 60–100 Mesh (percent) | 100–200 Mesh (percent) | 200–400 Mesh (percent) | 72 Hr. Ball Milled (percent) | 200 Hr. Ball Milled (percent) |
| Bardet | 20 | | | | 19.9 | | |
| Bouchet | 20 | | | | 19.7 | | |
| Heyman | 20 | | | | 18.3 | | |
| De Senarclens | 6 | 6.0 | 5.96 | 5.95 | 5.97 | 5.34 | 4.78 |
| | 10 | 10.0 | 9.98 | 9.94 | 9.95 | 9.7 | 8.67 |
| | 20 | 19.95 | 19.5 | 19.8 | 19.05 | 19.1 | 18.7 |
| | 30 | 29.6 | 29.4 | 29.3 | 28.2 | 27.5 | 26.3 |

It will be readily apparent from the foregoing tables that addition of resins markedly improves the drainage characteristics of the mica pulp slurry so that continuous production of relatively thick non-laminar reconstituted mica sheets is commercially feasible. In addition, the reconstituted mica sheets of the present invention are signally superior in that they are formed with resin uniformly distributed therethrough, thus eliminating the necessity of subsequent impregnation with resins (often virtually an impossibility with relatively thick sheets exceeding approximately 10 mils (.25 mm.) in thickness).

It will also be seen from the tables that optimum drainage characteristics can be achieved by the proper selection of resin particle size in relation to the level of resin addition. Thus, at a low level of resin addition, for example, 6% resin addition, drainage characteristics are best in the 200 to 400 mesh particle size range. Conversely, at a high level of resin addition, viz., 30%, the drainage characteristics are superior in the 24 to 60 mesh particle size range. It is, of course, axiomatic that the number of particles for a given quantity of resin is dependent on the size of the individual particles. Hence, at low levels of resin addition, the number of particles present at the 200 to 400 mesh particle size range in the slurry aids in "opening" the sheet and thus promotes drainage. Of course, as is evident from the tables, extremely fine particles of the order of less than 15 microns (sub-sieve sizes), would result in greater resin loss (Table 5) and insufficient "opening" of the sheet for proper drainage (Tables 2 and 3). Resin retention, however, was much better in all cases than would normally be expected especially since virtually all of the resin particles were small enough to pass through the forming screen of the sheet mold or the wire openings of the Fourdrinier wire (see Table 5).

It has been seen that by methods of the present invention, involving the addition of organic particulate heat-flowable, water-insoluble bonding material to the mica pulp slurry, relatively thick non-laminar sheet composites of paper-forming mica particles can be conveniently manufactured. Significantly, sheets having a nominal unpressed thickness in the order of 120 mils (3 mm.) nominal pressed thickness of 60 mils (1.5 mm.)) as well as rather thin sheets of the order of 4 to 6 mils (0.1 to .15 mm.) can be manufactured.

What I claim is:

1. A porous non-laminar mica sheet composite, capable upon application of heat and pressure thereto, of forming a firmly bonded substantially void-free insulative product at least 4 mils in pressed thickness, said composite comprising a sheet of finely-divided highly flaked mica having particles of a flowable binder uniformly distributed about and between the mica flakes, the effective size of said particles being at least 15 microns and substantially greater than the thickness of said flakes.

2. A method of manufacturing a non-laminar mica sheet composite at least 4 mils in pressed thickness comprising forming an aqueous slurry of finely-divided highly flaked mica and particulate heat-flowable water-insoluble bonding material, the effective size of said particles being at least 15 microns and substantially greater than the thickness of said flakes, applying said slurry to a forming screen, drawing water from said applied slurry through said screen to form a handleable sheet, and drying said sheet at least to a self-sustaining state.

3. A method according to claim 2 wherein the particles of bonding material have a size range of from 40 to 400 mesh and are present in an amount of about 6 to 30 parts by weight per 100 parts of slurry.

4. A method according to claim 3 wherein the bonding material is shellac.

5. A method according to claim 3 wherein the bonding material is an epoxy resin.

6. A method according to claim 3 wherein the bonding material is a silicone resin.

7. A method according to claim 3 wherein the bonding material is a polyester resin.

8. A method according to claim 3 wherein the particles have an effective particle size of at least 37 microns.

References Cited by the Examiner

UNITED STATES PATENTS

| | | | |
|---|---|---|---|
| 2,704,105 | 3/55 | Robinson et al. | 154—2.6 |
| 2,791,262 | 5/57 | Budnik | 154—2.6 |
| 2,859,794 | 11/58 | Barr | 154—2.6 |

EARL M. BERGERT, *Primary Examiner.*